United States Patent

Ostapchenko et al.

[11] Patent Number: 6,027,677
[45] Date of Patent: Feb. 22, 2000

[54] FILMS CONTAINING POLY(HYDROXY ACID)S

[75] Inventors: George Joseph Ostapchenko, Wilmington, Del.; Richard G. Sinclair, Columbus, Ohio

[73] Assignee: Chronopol, Inc., Golden, Colo.

[21] Appl. No.: 08/437,713

[22] Filed: May 9, 1995

Related U.S. Application Data

[63] Continuation of application No. 08/323,300, Oct. 14, 1994, abandoned, which is a continuation-in-part of application No. 07/580,526, Sep. 11, 1990, abandoned, which is a continuation-in-part of application No. 07/579,460, Sep. 6, 1990, Pat. No. 5,252,642, which is a continuation-in-part of application No. 07/579,000, Sep. 6, 1990, Pat. No. 5,216,050, which is a continuation-in-part of application No. 07/387,676, Jul. 31, 1989, abandoned, which is a continuation-in-part of application No. 07/229,896, Aug. 8, 1988, abandoned.

[51] Int. Cl.[7] .............................. B29C 55/12; B29C 71/02
[52] U.S. Cl. ................... 264/210.1; 264/211; 264/211.2; 524/539; 525/186; 525/190; 525/411; 525/412; 525/437; 525/450
[58] Field of Search ..................................... 525/411, 437, 525/450, 186, 190, 412; 524/539; 264/210.1, 211, 211.2; 428/220

[56] References Cited

U.S. PATENT DOCUMENTS

| | | | |
|---|---|---|---|
| 3,892,821 | 7/1975 | Koleske | 525/411 |
| 4,393,167 | 7/1983 | Holmes | 525/64 |
| 4,661,530 | 4/1987 | Gogolewski | 521/137 |
| 5,076,983 | 12/1991 | Loomes et al. | 264/101 |
| 5,180,765 | 1/1993 | Sinclair | 524/306 |
| 5,216,050 | 6/1993 | Sinclair | 524/108 |
| 5,252,642 | 10/1993 | Sinclair | 524/108 |

FOREIGN PATENT DOCUMENTS

WO/90 01521  2/1990  WIPO.

*Primary Examiner*—Patricia A. Short
*Attorney, Agent, or Firm*—Sheridan Ross P.C.

[57] ABSTRACT

Compatible polymer compositions and optically clear, degradable films containing from 55 to 90 wt % of a poly(hydroxy acid) polymer composition and from 10 to 45 wt % of one or more compatible thermoplastic polymers are disclosed. The films are prepared by melt processing the materials to obtain uniform composition, and forming the composition into a film of thickness from 0.01 to 2 mm. The films can be used in packaging and conventional applications.

10 Claims, No Drawings

FILMS CONTAINING POLY(HYDROXY ACID)S

CROSS-REFERENCE TO RELATED APPLICATIONS

This Application is a continuation of Ser. No. 08/323,300, "Films Containing Polyhydroxy Acids", filed on Oct. 14, 1994, now abandoned, which is a continuation-in-part of Ser. No. 07/580,526 Films Containing Polyhydroxy Acids, filed Sep. 11, 1990, now abandoned, incorporated herein by reference, which is a continuation-in-part of Ser. No. 07/579,460, "Degradable Impact Modified Polylactic acid," filed Sep. 6, 1990, now issued as U.S. Pat. No. 5,252,642, and Ser. No. 07/579,000, "Blends of Polylactic Acid," filed Sep. 6, 1990, now issued as U.S. Pat. No. 5,216,050, which are continuation-in-parts of Ser. No. 07/387,676, filed Jul. 31, 1989, now abandoned, which is a continuation-in-part of Ser. No. 07/229,896, filed Aug. 8, 1988, now abandoned.

FIELD OF THE INVENTION

This invention relates to compatible polymer compositions that comprise a major amount of a poly(hydroxy acid) polymer composition and a minor amount of one or more other compatible thermoplastic polymers.

BACKGROUND OF THE INVENTION

Polymers and copolymers of hydroxy acids, generally known as poly(hydroxy acid)s, slowly hydrolyze and biodegrade to environmentally benign products. These materials are well behaved thermoplastics with appealing aesthetic qualities. Consequently, high molecular weight poly(hydroxy acid)s, particularly polymers and copolymers of lactic acid and glycolic acid, are potential replacements for poly(styrene) and other non-biodegradable polymers in numerous applications, especially packaging.

It is desirable for packaging material to possess additional beneficial physical properties including optical clarity, tensile strength, elasticity, resistance to puncture and, optionally, to be shrinkable. Shrinkable films are useful for "shrink-wrap" packaging. Shrink-wrapping is the process by which a film structure placed around an object contracts to provide a tight, protective, self-sealing container, upon application of convective or radiant heat. In order to make poly(hydroxy acid) films shrinkable, they must be oriented by mechanical stretching procedures.

Many high molecular weight poly(hydroxy acid)s of commercial significance contain large proportions of specific asymmetric carbon atoms and may be, therefore, appreciably crystalline and brittle. Such polymers are less able to withstand demanding film-forming and orientation processes without excessive film breakage causing low yield and productivity. Films produced from these polymers can become brittle on aging.

Poly(hydroxy acid) film can be made more pliable by incorporation of a plasticizer, especially large amounts of monomeric and low molecular weight oligomeric 2-hydroxyacid species. Sinclair, U.S. Pat. No. 5,180,765, describes poly(lactic acid) plasticized with monomers and low molecular weight oligomers of lactic acid. However, such plasticized poly(hydroxy acid) compositions can be difficult to extrude into films because they stick to the film-making equipment, produce films of non-uniform thickness and the plasticizer often fouls the equipment. Even when successfully processed to film form, significantly plasticized poly(hydroxy acid) compositions have glass transition temperatures that are near ambient temperatures and may not be stable under storage conditions found in warm climates. In addition, they may not have appropriate rate of degradation to maintain structural integrity during the intended life of the package. A need exists for significantly degradable compositions that may be processed economically, and with high yield, into optically clear, robust films for commercial packaging and other applications.

SUMMARY OF THE INVENTION

In one embodiment the invention is a compatible polymer composition comprising:

(I) from 55 to 90 wt % of a poly(hydroxy acid) polymer composition, the poly(hydroxy acid) polymer composition comprising:
  (A) from 92 to 100 wt % of a poly(hydroxy acid), the poly(hydroxy acid) selected from the group consisting of:
    (1) homopolymers and copolymers consisting essentially of hydroxy acid monomer units selected from:
      (a) (O(CR'R")$_n$CO);
      (b) (OCR'R"COOCR'R"CO);
      (c) (OCR'R"CR'R"OCR'R"CO); and
      (d) (OCR'R"CR'R"ZCR'R"CR'R"CO); and
    (2) copolymers consisting essentially of hydroxy acid monomer units (a)–(b) and monomer units derived from other comonomers;
    wherein n is 2, 4 or 5; the total number of monomer units in the poly(hydroxy acid) polymer is about 350 to 5,000; R' and R" are independently selected from hydrogen, hydrocarbyl containing 1 to 12 carbon atoms and substituted hydrocarbyl containing 1 to 12 carbon atoms; Z is oxygen, sulfur, NR' or PR'; and
  (B) 0 to 8 wt % of a compatible plasticizer, the plasticizer consisting essentially of hydroxy acid monomer and low molecular weight hydroxy acid oligomers; and
(II) from 10 to 45 wt % of one or more compatible thermoplastic polymers other than those of (A).

In another embodiment the invention is a process for making an optically clear, degradable polymer film, the process comprising melting together the poly(hydroxy acid) polymer composition and the compatible thermoplastic polymer while subjecting the melt to sufficient mechanical agitation to form a uniform composition, and forming a film from the uniform composition.

DETAILED DESCRIPTION OF THE INVENTION

Poly(hydroxy acid) Polymer Composition

The poly(hydroxy acid) polymer composition contains 92–100 wt % of a poly(hydroxy acid) and 0 to 8 wt % of a compatible plasticizer. A poly(hydroxy acid) is a homopolymer or copolymer selected from the group consisting of:

(1) homopolymers and copolymers consisting essentially of hydroxy acid monomer units selected from:
  (a) (O(CR'R")$_n$CO);
  (b) (OCR'R"COOCR'R"CO);
  (c) (OCR'R"CR'R"OCR'R"CO); and
  (d) (OCR'R"CR'R"ZCR'R"CR'R"CO); and
(2) copolymers consisting essentially of hydroxy acid monomer units (a)–(d) and monomer units derived from other comonomers;
wherein n is 2, 4 or 5; the total number of monomer units in the poly(hydroxy acid) is about 350 to 5,000; R' and R" are independently selected from hydrogen, hydrocarbyl containing 1 to 12 carbon atoms and substituted hydrocarbyl containing 1 to 12 carbon atoms; Z is oxygen, sulfur, NR' or PR'.

The number of monomer units is selected to impart degree of crystallinity and crystallization rates appropriate to the desired degree of orientation and rate of degradation. Totals in the range of 1,000 to 3,500 are preferred. Monomer units in which R' and R" are selected from the group consisting of hydrogen and methyl are preferred. Copolymers of (a)–(d) with other comonomers in which the hydroxy acid monomer units (a)–(d) are at least 50 wt %, preferably at least 80 wt %, of the poly(hydroxy acid) are the preferred copolymers.

The poly(hydroxy acid) must have a molecular weight high enough to provide sufficient viscosity and strength to form a sustainable film from the melted compatible polymer composition. However, if the molecular weight is to high, excessive degradation occurs at the temperatures required to melt process the composition. The preferred weight average molecular weight is from about 20,000 to about 600,000; more preferably about 50,000 to about 600,000; and even more preferably about 150,000 to about 450,000.

Typical hydroxy acid monomer units of structure (a) are those derived from 3-hydroxypropanic acid; 2,2-dimethyl-3-hydroxypropanic acid; and 5-hydroxypentaoic acid.. Typical monomer units of structure (b) are derived from dimeric cyclic diesters such as glycolide (1,4-dioxane-2,5-dione), the dimeric cyclic diester of glycolic acid, and lactide (1,4-dioxane-3,6-dimethyl-2,5-dione), the dimeric cyclic diester of lactic acid, and thus contain two hydroxy acid subunits. Other comonomers include monomers capable of condensation polymerization with lactide or lactic acid, i.e., lactones such as $\epsilon$-caprolactone, 2-p-dioxanone, dodecanolactone; lactams; amino acids; and the monomers listed in Murdock, U.S. Pat. No. 4,800,219, column 5, line 27–35, incorporated herein by reference.

Monomer units of structure (b), especially those in which R' is hydrogen and R" is hydrogen or methyl (i.e., monomer units derived from glycolide or lactide), are more preferred. A highly preferred monomer unit is (b) in which R' is hydrogen and R" is methyl, i.e, the monomer unit derived from lactide. Lactide is prepared by: (1) polymerizing lactic acid to an oligomer, i.e, a relatively low molecular weight poly(lactic acid), (2) heating the oligomer, generally in the presence of a catalyst, to depolymerize it to lactide, (3) recovering and purifying the lactide. See, for example: Lowe, U.S. Pat. No. 2,668,162; Bhatia, U.S. Pat. Nos. 4,835,293 and 5,023,349; DeVries, U.S. Pat. No. 4,797,468; and Muller, U.S. Pat. No. 5,053,522.

Poly(hydroxy acid)s are typically prepared by the catalyzed ring opening polymerization of the cyclic ester, i.e., a lactone, or the dimeric cyclic ester of the monomer. Copolymers are typically prepared by catalyzed copolymerization of two or more cyclic esters and/or dimeric cyclic esters. Because of their manner of preparation poly(lactic acid) and poly(glycolic acid) are sometimes referred to as poly (lactide) and poly(glycolide), respectively. The homopolymers of the hydroxy acids that form cyclic esters are sometimes referred to as polymers of the corresponding lactone, i.e, poly($\epsilon$-caprolactone), etc.

As will be apparent to those skilled in the art, monomer unit (b) contains two hydroxy acid subunits. When both R' and R" are hydrogen, unit (b) contains two subunits derived from glycolic acid, and when R' is hydrogen and R" is methyl, unit (b) contains two subunits derived from lactic acid. These units are typically prepared by polymerization of the corresponding cyclic diesters. Consequently, a glycolide unit corresponds to two glycolic acid subunits and a lactide unit corresponds to two lactic acid subunits.

Polymerization of cyclic esters and dimeric cyclic esters catalyzed by tin compounds is disclosed in: Young, U.S. Pat. No. 2,890,208; Blood, U.S. Pat. No. 3,645,941; and Versfelt, U.S. Pat. No. 3,839,297. Tin compounds, such as stannous 2-ethylhexanoate (tin octoate) and other esters of tin(II) with carboxylic acids containing up to 18 carbon atoms as well as tetraphenyl tin, are well known lactide polymerization catalysts. Polymerization with tin oxides is described in H. R. Kricheldorf and A. Serra, *Polymer Bulletin*, 14, 497–502 (1985). Polymerization of lactide with tin octoate is described in J. W. Leenslag and A. J. Pennings, *Makromol. Chem.* 188, 1809–1814 (1987). Polymerization of lactide with catalysts such as yttrium tris(methyl-S-lactate) and samarium tris(2-N,N-dimethylamino-ethoxide), is described in McLain, U.S. Pat. No. 5,028,667. Polymerization of lactide with lanthanum bis(2,2,6,6-tetramethylheptane-3,5-dionato)-i-propoxide is described in Ford, U.S. Pat. No. 5,208,297. Polymerization of lactide with ether complexes such as the lanthanum tris(2,2,6,6-tetramethylheptanedionate)diethyleneglycol diethylether complex is described in Ford, PCT Application PCT/US92/11309.

Lactic acid has two optical isomers, D-lactic acid and L-lactic acid. These isomers differ in the absolute configuration of the asymmetric carbon atom. The asymmetric carbon atom of D-lactic acid has the R-configuration; the asymmetric carbon atom of L-lactic acid has the S-configuration. Preferred poly(hydroxy acid)s are those in which 55–100 mol % of the monomer units are derived from lactide (i.e., monomer unit (b) in which R' is hydrogen and R" is methyl) and 80–98 mol % of the asymmetric carbon atoms the same absolute configuration (i.e., are derived from either D-lactic acid or L-lactic acid). If additional monomer units are present, they are either hydroxy acid units (a) to (d), excluding monomer units derived from lactide (i.e., units of structure (b) in which R' is hydrogen and R" is methyl) and/or suitable non-hydroxy acid comonomers.

Films produced from polymers outside this range may be hazy and/or brittle. For example, polymer films having fractions more than 98% of the asymmetric carbons in the same configuration are substantially crystalline after hot processing. Crystallinity is detrimental to film-forming capability, to optical clarity of films formed from crystalline polymers and to the ability to successfully orient films formed by stretching if desired. Films containing crystalline polymers are also more brittle than films containing amorphous polymers.

To promote maximum processibility and product properties, it is generally desirable for amount of asymmetric carbon in one configuration to be selected to produce a poly(hydroxy acid) that has a melting point close to that of the compatible polymer, if possible. However, polymers containing more equal fractions of R- and S-carbon atoms are more readily hydrolyzed and are more prone to degradation during thermal processing.

The negative effects of highly crystalline polymer on film properties may be reduced by plasticization with small amounts monomer and/or low molecular weight oligomers including cyclic diesters. Excessive concentration of plasticizer in the film is undesirable. It produces films of uneven thickness. Where films are made by casting onto drums, excessive plasticizer may separate from the film, stick to and foul the drum, or may cause the film to stick to the drum. Thus, it is necessary to use polymer containing a minimal amount of plasticizer. The poly(hydroxy acid) composition may comprise up to about 8 wt % of plasticizer. The preferred range is 0.10 to 8 wt %, and more preferably from about 0.2 to 6 wt %. A highly preferable range is from about 0.2 to 0.4 wt % plasticizer. Plasticizer content may be determined by the methods described by Kohn, *J. Appl. Poly. Sci.*, 29, 4265–4277 (1984).

Due to volatilization the amount of plasticizer in the final product may be less than that present in the feed to the film extrusion process. When it is necessary to reduce the concentration of plasticizers in a plasticizer-rich composition, a devolatilizing extruder can be used either as a separate step or during film extrusion.

The poly(hydroxy acid) glass transition temperature ($T_g$) can be measured by differential scanning calorimetry. $T_g$ decreases with increasing plasticizer content. For a poly (lactide) prepared from 90% S-lactide and 10% R,S-lactide (95% of the units derived from lactic acid are in the L-configuration and 5% are in the D-configuration), $T_g$ is about 60° C. for a composition containing 0.28 wt % plasticizer but only 40° C. for a composition containing 20 wt % plasticizer. Polymers with high plasticizer concentrations are generally unacceptable because the glass transition temperatures are too near temperatures encountered during storage and transport in warm climate regions.

Compatible Thermoplastic Polymers

A thermoplastic non-poly(hydroxy acid) compatible polymer is a non-poly(hydroxy acid) that will blend with the poly(hydroxy acid) polymer composition sufficiently homogeneously as not to exhibit gross symptoms of polymer segregation. They must be sufficiently compatible with the poly(hydroxy acid) polymer compositions to produce optically clear biaxially oriented films. The films must be sufficiently clear that they do not obscure or distort graphics on objects that have been wrapped in biaxially oriented film or that have been packaged in heat set, non-shrinkable film. Hazy films have impaired transparency caused by the exuding of low molecular weight plasticizer to the surfaces of the films, high crystalline content of the poly(hydroxy acid), or inadequate compatibility the polymer blend. A blend that is heterogeneous on a microscopic level is incompatible.

Compatible polymers are generally characterized as having a sufficient number and distribution of hydrophilic groups, preferably selected from among hydroxy, ester, amide, ether carboxyl, ionic carboxylate and urethane, to from a compatible polymer blend with poly(hydroxy acid) polymer compositions. Preferred compatible polymers include polyesters, copolyetheresters, polyurethanes, ethylene/vinyl alcohol copolymers, copolyamideetheresters, ethylene/vinyl ester copolymers and terpolymers, ethylene/vinyl acid copolymers and terpolymers and their metal salts, ethylene/carbon monoxide copolymers and copolyetherimidesters. The low molecular weight polyesters that have a high degree of degradability are particularly preferred.

Particularly suitable compatible polymers are copolyetheresters, such as the copolyetherester elastomers commercially available from E. I. du Pont de Nemours and Company as Hytrel® polyester elastomers. These copolyetherester elastomers consist essentially of a multiplicity of recurring intralinear long chain and short chain ester units connected head-to-tail through ester linkages. The long chain units are represented by the formula:

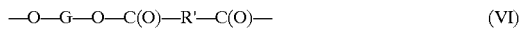
—O—G—O—C(O)—R'—C(O)—   (VI)

and short chain ester units are represented by the formula:

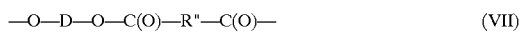
—O—D—O—C(O)—R"—C(O)—   (VII)

wherein:

G is a divalent radical remaining after the removal of terminal hydroxyl groups from a poly(alkylene oxide) glycol having an average molecular weight of 400 to 3,500 and a ratio of the number of alkylene oxide carbon to oxygen atoms of 2 to 4.3, preferably 2.5 to 3.5;

R' and R" are divalent radicals remaining after removal of carboxyl groups from a dicarboxylic acid having a molecular weight less than 300; and D is a divalent radical remaining after the removal of hydroxyl groups from a diol having a molecular weight less than about 250.

The copolyetherester has from about 25 to 50 weight percent of short-chain ester units (VII).

A particularly suitable copolyetherester of this type is one that contains units (VI) derived from 1,4-butylene terephthalate and 75 wt % of repeating units (VII) derived from poly(tetramethylene ether)glycol terephthalate. The poly (tetramethylene ether)glycol used to make the copolyetherester has a molecular weight of about 2,000. This material is designated Copolyetherester A.

Another class of suitable compatible thermoplastic polymers are ethylene/vinyl alcohol copolymers containing less than 50 mol % ethylene.

Compatible Polymer Composition

The compatible polymer composition contains from 55 to 90 wt % of the poly(hydroxy acid) composition and from 10 to 45 wt % of one or more compatible thermoplastic polymers other than the poly(hydroxy acid)s listed in (A), above.

Small amounts of other materials, such as a thermal stabilizer or dyes, may also be present. As described in U.S. patent application Ser. No. 08/107,646, incorporated herein by reference, the thermal stability of a poly(hydroxy acid) may be improved by addition of an effective amount of a thermal stabilizer selected from the group consisting of: boric oxide; boric acids; borate esters; boroxines; polyborate esters; and borate salts. A preferred thermal stabilizer is boric oxide. Dyes and/or pigments may be added to impart color to the compatible polymer composition provided they do not adversely affect the properties of the composition.

Unlike many other materials used in packaging film, the compatible polymer compositions of this invention are degradable. The term "degradable" means that the poly (hydroxy acid) portion of the material is biodegradable and, more importantly, degradable by hydrolysis.

The degradation rate must be controlled so it is consistent with intended usage, i.e., the product does not degrade significantly in normal storage and usage, but will degrade in a reasonable time, after discarding. Reduced tensile strength of the film caused by the deterioration during storage, for example, could produce film rupture during processing, making the film unacceptable for commercial packaging applications. The hydrolysis degradation of a polymer can be tailored readily to meet the requirements of use and disposal of the film. It depends primarily on the nature of groups in the chains. As is well known to those skilled in the art, process conditions such as moisture, pH, temperature, ion strength, sunlight, enzymes, polymer crystallinity and hydrophilicity of the polymer affect degradation of the polymer.

The compatible compositions are formed into films of uniform thickness, about 0.01 to about 2 mm thick. Films may be formed by melt extrusion and sheet casting, blow molding, precipitation from solvent or other means well known to those skilled in the art. If desired, the films may be fed directly to orientation equipment or wound on spools or otherwise conveniently collected for storage and subsequent processing or use. These films normally have a tensile strength of 70–150 mPa and elongation at break of 50–90%.

Shrinkage value is an indicator of film shrinkage performance. The amount of shrinkage or the resilience of the film can be controlled by the amount and type of compatible polymer included in the compatible polymer composition. This allows the compatible polymer composition to be designed for a for particular use. Films useful in shrink-wrap packaging applications may be prepared from many of the blends by biaxially orienting the films. Biaxially orienting means to stretch the film in the direction which it travels, called the machine direction (MD), and in the direction 90 degrees to the machine direction in the plane of the film, known as the transverse or circumferential direction (TD), thereby extending the film to at least two times its initial MD and TD direction dimensions, while heating and maintaining film temperature above the poly(hydroxy acid) polymer composition glass transition temperature but below the melting temperature of any of the polymer components of the film, normally at least 5° C. below the melting point. Biaxial orienting includes all conventional techniques including simultaneous MD and TD stretching, sequential stretching, and tube blowing.

Shrinkage can be measured by cutting a 10 cm by 10 cm sample from oriented film with edges of the sample parallel to machine and transverse film directions; immersing the sample in boiling water for 1 minute; measuring and averaging the length and width of the boiled film; and calculating percent shrinkage value by subtracting the average boiled film length and width from 10, then multiplying the difference by 10. For example, assuming that the average of length and width dimensions of a boiled film sample is 6 cm, shrinkage is 40%.

Biaxially oriented films can be made non-shrinkable by heat-setting. "Non-shrinkable" products are defined as films that will not shrink more than 5% when immersed in boiling water for 1 minute. Heat-setting is achieved by subjecting the oriented polymeric film to a temperature above the poly(hydroxy acid) glass transition temperature but well below its melting temperature while maintaining the film under restraint. The duration of heat-setting found effective is from about 1 to 120 seconds and preferably from about 1 to 80 seconds.

INDUSTRIAL APPLICABILITY

Non-shrinkable degradable films can be used in microwave-cookable food packaging, trash bags and waste container liners. Shrinkable degradable films can be used for shrink-wrap packaging applications.

EXAMPLES

The advantageous properties of the invention can be observed by reference to the following examples which illustrate, but do not limit, the invention. All parts, proportions, and percentages are by weight, unless otherwise indicated. All units have been converted to SI units.

Example 1

A blend consisting of 65% of an 85–95% S-/5–15% S.R-optically active carbon content poly(lactide) having about 6% plasticizer and molecular weight of about 350,000, and 35% of Copolyetherester A, was extruded into a film of 0.2 mm thickness. It was biaxially oriented by stretching 3× in the MD and TD at a temperature of 75° C. to produce a film having shrinkage value in boiling water of 55%, a tensile strength of 73 mPa and an elongation at break of 58%.

Example 2

A blend consisting of 70% of poly(lactide) having about 95% S-/5% S,R-optically active carbons, molecular weight of about 200,000 and about 2% plasticizer as determined by lactide content analysis, and 30% of ethylene/vinyl alcohol copolymer with ethylene content of 44 mol %, was extruded into a 0.23 mm thick film. The film was biaxially oriented as described in Example 1 to produce a film having a shrinkage value of 42% in boiling water, tensile strength of 150 mPa and elongations at break of 85%. The biaxially oriented film has excellent shrink-wrap capability and no film degradation is observed after aging 12 months at room temperature, indicating significant shelf life for this film.

Example 3

Prior to heat-setting, a sample of the biaxially oriented film of Example 1 was wrapped around a 7.6 cm wide, 12.7 cm long, 0.64 cm high pad of paper and held in place with double-sided adhesive tape. The wrapped package was placed in a hot air convection oven at 100° C. for 1 min. The film shrank uniformly around the pad and was optically clear and glossy.

What is claimed is:

1. A process for making a biodegradable optically clear polymer film, the process comprising:
(I) melting together:
    (A) at least 55 wt % of a poly(hydroxy acid) polymer composition, the poly(hydroxy acid) polymer composition comprising;
        (i) at least 92 wt % of a poly(hydroxy acid), the poly(hydroxy acid) selected from the group consisting of:
            (a) homopolymers and copolymers of hydroxy acid monomer units (OCR'R"COOCR'R"CO) wherein R' is hydrogen and R" is methyl; and
            (b) copolymers consisting essentially of at least 55 mole % hydroxy acid monomer units from (a) and no more than 45 mole % monomer units derived from other comonomers including;
                (i) (OCR'R"COOCR'R"CO);
                (ii) (O(CR'R")nCO);
                (iii) (OCR'R"CR'R"OCR'R"CO); and
                (iv) (OCR'R"CR'R"ZCR'R"CR'R"CO);
                    wherein n is 2, 4 or 5; the total number of monomer units in the poly(hydroxy acid) is about 350 to 5,000 and the average molecular weight is 20,000 to 600,000; R' and R" are independently selected from hydrogen, hydrocarbyl containing 1 to 12 carbon atoms and substituted hydrocarbyl containing 1 to 12 carbon atoms; Z is oxygen, sulfur, NR' or PR' and
        (ii) a compatible plasticizer and
    (B) at least 10 wt % of one or more compatible thermoplastic polymers other than those of (A), wherein the compatible thermoplastic polymer includes at least one hydrophilic group to form a polymer blend composition;
(II) forming an optically clear film from the polymer blend composition; and (III) biaxially orienting the optically clear film to form the biodegradable optically clear polymer film, the biaxially orienting step being conducted at a temperature above the poly(hydroxy acid) polymer composition glass transition temperature and at least 5° C. below the melting temperature of the poly(hydroxy acid) polymer composition.

2. The process of claim 1 in which the compatible thermoplastic polymer is selected from the group consisting of copolyetheresters and ethylene/vinyl alcohol copolymers containing less than 50 mol % ethylene.

3. The process of claim 2 wherein step (III) comprises:
   stretching the optically clear film to greater than two times its initial machine direction and transverse direction dimensions.

4. The process of claim 1 wherein the biodegradable optically clear film comprises from about 0.10 to about 8 wt % compatible plasticizer.

5. The process of claim 1, wherein the biodegradable optically clear polymer film has a tensile strength of at least about 70 mPa and an elongation at break of at least 50%.

6. The process of claim 1 additionally comprising, after step (III):
   (IV) heat-setting the biodegradable optically clear polymer film at a temperature above the poly(hydroxy acid) glass transition temperature and below the poly (hydroxy acid) melting temperature while maintaining the film under restraint.

7. The process of claim 1 wherein step (I) comprises:
   selecting an amount of asymmetric carbon in the hydroxy acid monomer units to produce a poly(hydroxy acid) having a melting point close to that of the compatible thermoplastic polymer.

8. The process of claim 1, wherein the hydrophilic group is selected from the group consisting of hydroxy, ester, amide, ethercarboxyl, ionic carboxylate, and urethane.

9. A process for making a biodegradable optically clear polymer film, the process comprising:
(I) melting together:
   (A) at least 55 wt % of a poly(hydroxy acid) polymer composition, the poly(hydroxy acid) polymer composition comprising;
      (i) at least 92 wt % of a poly(hydroxy acid), the poly(hydroxy acid) selected from the group consisting of:
         (a) homopolymers and copolymers of hydroxy acid monomer units (OCR'R"COOCR'R"CO) wherein R' is hydrogen and R" is methyl; and
         (b) copolymers consisting essentially of at least 55 mole % hydroxy acid monomer units from (a) and no more than 45 mole % monomer units derived from other comonomers including;
            (i) (OCR'R"COOCR'R"CO);
            (ii) (O(CR'R")nCO);
            (iii) (OCR'R"CR'R"OCR'R"CO); and
            (iv) (OCR'R"CR'R"ZCR'R"CR'R"CO);
         wherein n is 2, 4 or 5; the total number of monomer units in the poly(hydroxy acid) is about 350 to 5,000 and the average molecular weight is 20,000 to 600,000; R' and R" are independently selected from hydrogen, hydrocarbyl containing 1 to 12 carbon atoms and substituted hydrocarbyl containing 1 to 12 carbon atoms; Z is oxygen, sulfur, NR' or PR' and
      (ii) a compatible plasticizer and
   (B) at least 10 wt % of one or more compatible thermoplastic polymers other than those of (A), wherein the compatible thermoplastic polymer includes at least one hydrophilic group;
(II) forming an optically clear film from the uniform composition; and
(III) heat-setting the optically clear film at a temperature above the poly(hydroxy acid) polymer composition glass transition temperature and below the poly(hydroxy acid) polymer composition melting temperature while maintaining the film under restraint.

10. The process of claim 9, wherein the optically clear film comprises from about 0.10 to about 8 wt % compatible plasticizer.

* * * * *